Oct. 2, 1945.  M. WATTER  2,386,170
AIRFOIL CONSTRUCTION
Filed May 17, 1943  2 Sheets-Sheet 1
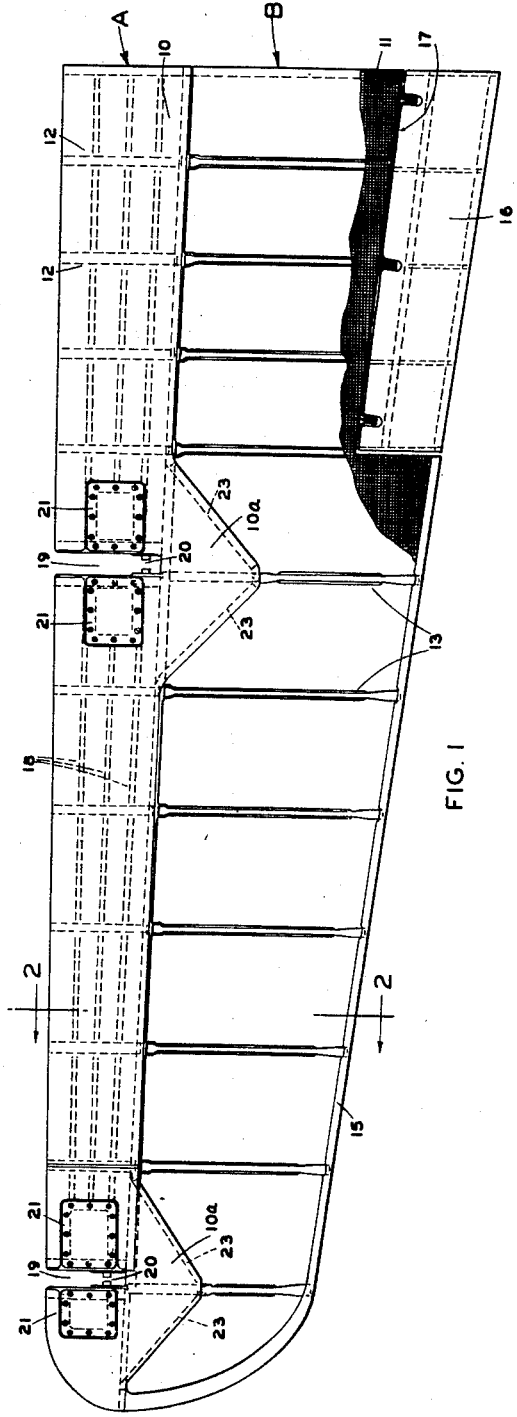
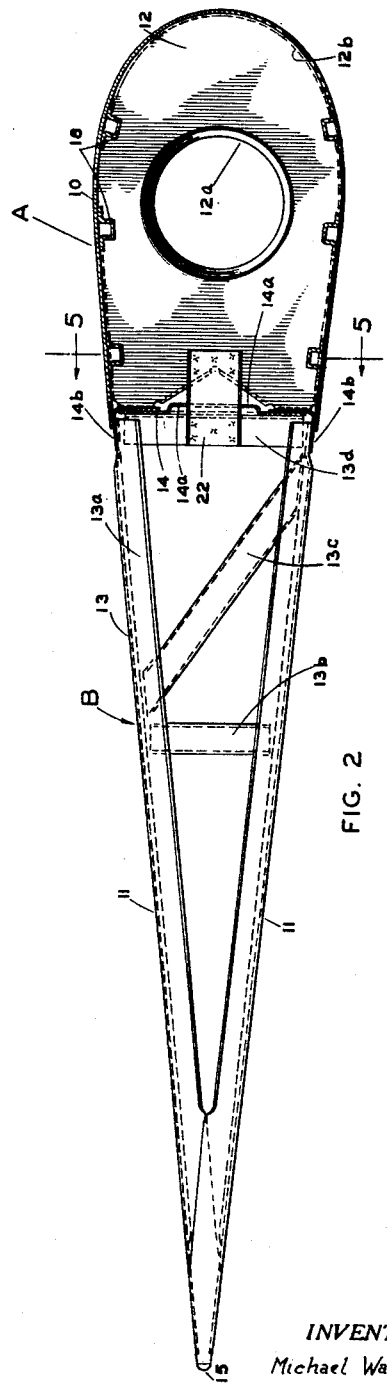
INVENTOR
Michael Watter
BY John P. Tarbox
ATTORNEY Oct. 2, 1945.          M. WATTER          2,386,170
AIRFOIL CONSTRUCTION
Filed May 17, 1943          2 Sheets-Sheet 2
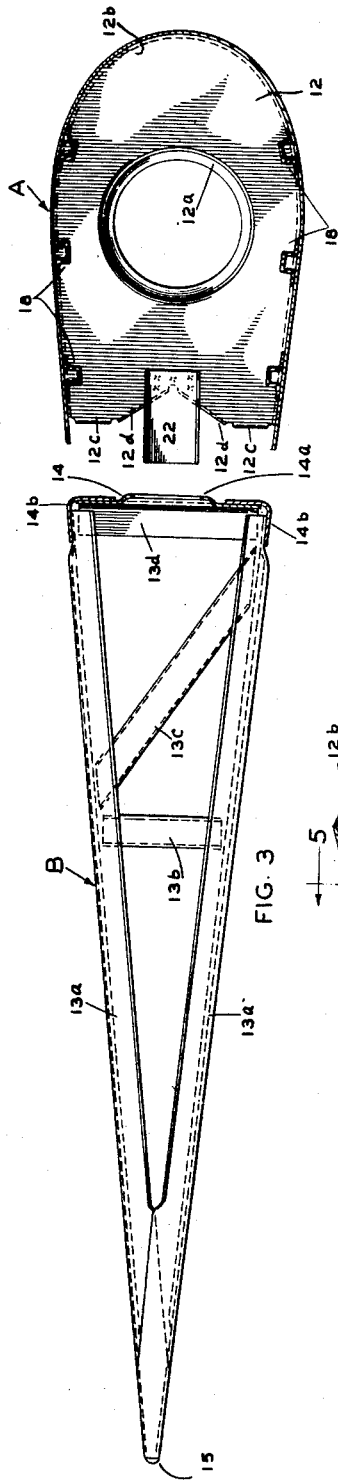
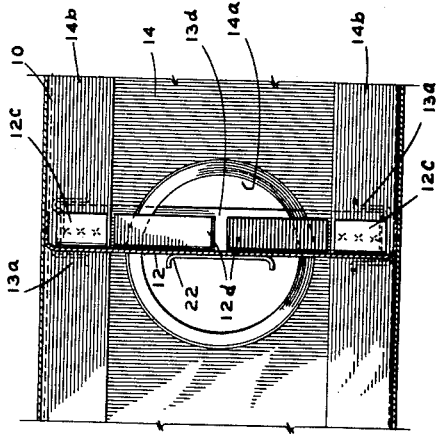
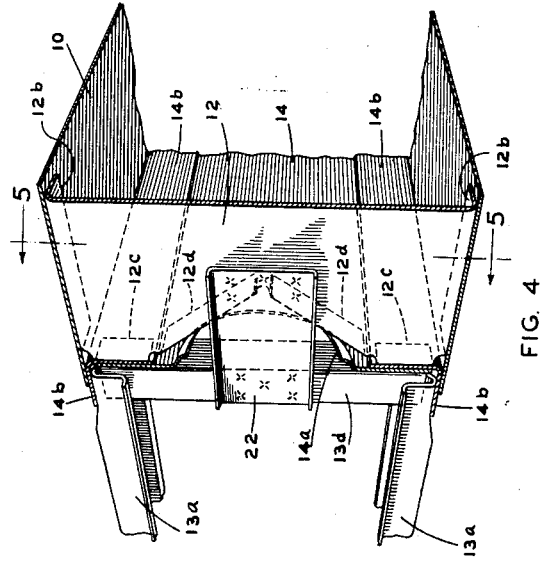
INVENTOR
Michael Watter
BY John R. Tarbox
ATTORNEY Patented Oct. 2, 1945

2,386,170

UNITED STATES PATENT OFFICE 2,386,170

AIRFOIL CONSTRUCTION

Michael Watter, Philadelphia, Pa., assignor to Edward G. Budd Manufacturing Company, Philadelphia, Pa., a corporation of Pennsylvania Application May 17, 1943, Serial No. 487,242

11 Claims. (Cl. 244—123)

This invention relates to airfoils and the like, particularly to the connection between the leading or nose section and the trailing section of an airfoil, and has for an object the provision of improvements in this art, particularly the provision of a light weight, high strength structure.

It is the aim in airfoil construction to design the same for lightness in weight and high strength. In airfoils of the movable type, such as ailerons, elevators, rudders, and the like, it is common practice to provide a nose section embodying a spar which with the nose ribs and skin covering constitutes a torque box, and a trailing section, the pivotal axis being within the nose section. As a result, the forces acting against one surface of the trailing section tend to fulcrum the trailing section about the region of connection of the opposite side thereof with the spar or nose section, thus creating shear stresses at the connection of the spar or nose section with the side of the trailing section against which these forces are acting. In order to withstand these stresses it has been the practice to utilize heavy structures at the aforesaid connections. Such structures add considerable weight to the airfoil.

It is the aim of the present invention to provide airfoil structure of light gauge metal in which means is provided for effectively decreasing tension stresses tending to rupture the connections of the trailing section with the opposite sides of the nose section. Another aim is that of providing such assembly units which are capable of relatively easy and rapid assembly by electric spot welding or by riveting.

For convenience in construction and assembly through the use of spot welding and for improvement in inspection procedure it is proposed to form the leading edge section and the trailing edge section as separate sub-assembly units which can be readily secured together in the final assembly operation on the airfoil. The particular airfoil which is illustrated herein is an elevator for a horizontal stabilizer. The nose section may be covered with metal and the trailing section with fabric. The fabric is applied to the trailing section after the metal framework therefor has been completed, hence access is provided from the rear and between the trailing ribs for connecting the nose and trailing sections. The nose section may be covered when formed. The joint provided by the present invention is especially designed for such a construction and is so formed as to make the connecting procedure easy and the connecting structure very strong.

An exemplary embodiment of the invention is illustrated in the accompanying drawings, wherein:

Fig. 1 is a top plan view of an airplane elevator or movable airfoil embodying the invention;

Fig. 2 is a typical vertical chordwise section taken on the line 2—2 of Fig. 1;

Fig. 3 is a pre-assembly view of the parts shown in Fig. 2;

Fig. 4 is an enlarged perspective view of parts shown at the section joint in Fig. 2; and Fig. 5 is an enlarged partial vertical spanwise section taken on the line 5—5 of Fig. 2, the section also being indicated on Fig. 4.

Referring to the drawings, the airfoil comprises a leading or nose section A and a trailing section B, the former preferably being covered by a sheet metal skin 10 and the latter by fabric 11. The nose section includes rib elements 12 and the trailing section includes rib elements 13 aligned therewith on the opposite side of a spar 14. The spar connects together the forward ends of the several trailing rib elements 13. The rear ends of the rib elements 13 are connected together by a trailing edge strip 15 except at the location of the trim tab 16 and here a rear bulkhead 17 serves the purpose.

The nose rib elements 12 are each formed of a single sheet metal plate provided with a flanged opening 12a to reduce the weight thereof, a peripheral skin-supporting flange 12b, rear tab flanges 12c, and converging flanges 12d disposed between the tab flanges 12c. If and where desired, spanwise stiffening intercostal stringers 18 may be welded to the metal nose section skin 10 between the rib elements 12. As will be noted in Fig. 3, the nose skin 10 projects rearwardly beyond the rib elements 12.

At spaced points along the nose section, hinge bracket openings 19 may be provided and within them hinge pivot fittings 20 are suitably arranged. Removable cover plates 21 provide the required access to the interior of the nose section at these points.

The trailing section ribs 13 comprise rib chords 13a and truss struts 13b, 13c, the one being vertical and the other being inclined, it being obvious, however, that any desired number and arrangement of struts may be provided. The outer sides of the rib chords 13a are preferably joggled at their front ends for the reception of the outer flanges of spar chord members 14b presently to be described. As indicated in dotted lines in Fig. 5, the rib chords 13a are channel-shaped in section with their backs disposed outward. The backs of the chords 13a are grooved to assist in securing the fabric cover thereon, which may be done in various ways as is well known in the art.

The spar 14 is formed as a continuous plate web. At the rib locations it is provided with large flanged openings 14a and at the rearward side with channel stiffeners or struts 13d bridging the openings 14 and welded through the channel bottoms to the spar web. In assembling the spar web 14 and the trailing rib elements 13, the stiffeners or struts 13d are nested within the rib chord members 13a and welded thereto, also the lateral flanges of the spar chord members 14b overlap the joggled front ends of the trailing rib chords 13a and are welded thereto.

Prior to assembling the nose section and the trailing section, shallow channelled clips 22 are welded at their front ends to the webs of the nose rib elements 12 substantially midway the edges thereof and in such position as to pass through the web openings 14a when the two sections are assembled. When the two sections are brought into their proper relative positions, the projecting clips 22 overlap and abut the sides of the struts 13d and are welded thereto. At the time the clips are welded to the struts 13d, the tab flanges 12c of the nose rib elements are welded to the front flanges of the L-shaped spar chords 14b through the web of the spar and the backs of the channel-shaped struts 13d. The openings 14a are made of such size as to provide sufficient space on one side of the struts 13d to permit a bent part of spot-welding tongs to be inserted therethrough to make the welds. Should more space be needed, the connecting clips 22 may be secured to both the nose rib elements and the struts after the tabs 12c have been welded to the spar elements. These channelled clips transmit shear loads to the struts 13d substantially midway between the ends thereof, thus transferring a large portion of the stresses which ordinarily would be directed to the connections of the nose rib elements with the spar chords, to the struts 13d which interconnect the spar chords.

After the nose rib elements are welded in place, the rear edges of the metal skin 10 are welded to the L-shaped spar chord members 14b. In Fig. 1 it will be noted that the skin sheet 10 is extended at 10a behind the hinge joints and is welded to diagonals 23 secured to the spar and a trailing rib element.

Finally the fabric skin 11 is applied in any suitable manner and stretched.

One advantageous feature of the construction described is that the same may be composed of light weight structural sections and yet will be resistant to and can withstand severe torsional stresses, the channel-shaped clips 22 which are connected to the spar struts and to the nose rib elements materially increasing the strength of the structure in these respects.

It will thus be seen that the invention provides a very convenient construction for connecting a leading airfoil section to a trailing section; that the connection can be made very quickly; and that the assembled structure is extremely rigid and strong.

While the invention has been shown and described in connection with an elevator of an aircraft or the like, it is to be understood that it is equally as applicable to other airfoils, such for example as wing structures, ailerons, fins, and the like embodying a leading edge or nose portion and a trailing portion. Therefore the invention is limited only by the prior art and the scope of the subjoined claims.

What is claimed is:

1. An airfoil comprising in combination, a leading section which includes spaced rib elements covered by a metal skin, the rib elements having rear tabs, a trailing section which includes spaced rib elements aligned with the leading rib elements, a spar forming a connection between the leading and trailing sections and having openings in the line of the ribs, struts connected to the trailing ribs crossing the spar openings, and connecting elements on the leading rib elements extending rearwardly thereof to said struts through said spar openings, the rear tabs of the leading rib elements being secured to said spar, and the rear edges of the leading section skin being secured to the edges of the spar and to the front outer sides of the trailing ribs.

2. An airfoil comprising in combination, a leading section which includes plate-like rib elements covered by a metal skin having rearwardly protruding edges, the rib elements having rear tab flanges and a notch at the center between the rear tab flanges flanked by converging flanges; a trailing section which includes spaced rib elements aligned with the leading rib elements, the rib elements including inwardly opening channel-shaped rib chords and connecting struts, the front strut being channel-shaped and open to the rear, the rear ends of said rib chords being connected together and adjacent ribs being connected by an edge strip; a plate spar connecting together the front ends of said ribs, said spar having openings in the line of said ribs and including L-shaped chords at each edge, the outer flanges of said spar chords being welded to said rib chords and the backs of said leading rib struts being welded to said spar and the inner flanges of the spar chords; and connecting elements on the leading rib elements extending rearwardly thereof to the trailing rib strut through said spar openings, the rear tabs of the leading rib elements being secured to the inner flanges of said spar chords, and the rear edges of the leading section skin being welded to the outer spar chord flanges.

3. An airfoil comprising in combination, a plurality of leading rib elements each having peripheral flanges and rear end tabs, a cover skin secured over said leading rib elements, trailing rib elements aligned with the leading rib elements, a plate spar between said leading and trailing rib elements, said spar having openings in the line of said rib elements, connecting elements secured to said rib elements and passing through said spar openings, and said spar being secured at each edge to said leading and trailing rib elements, the spar also being connected to the leading rib elements through said rib tabs.

4. An airfoil comprising in combination, a leading section, a trailing section, and a spar connecting said sections, said leading section including plate ribs having rear tabs and covered by a metal skin sheet which projects beyond the rear ends of the ribs, said trailing section including chord-and-strut truss ribs aligned with the leading section ribs, said spar including a web and L-shaped chords secured to each edge thereof, the front strut of the trailing section rib being secured to the web and chords of the spar, the tabs of the leading section rib elements being secured to the web and chords of the spar and with them to the said front strut of the trailing section, and the projecting edges of the leading edge skin sheet being secured to the outer flanges of the spar chords and with them to the front ends of the trailing rib chords.

5. An airfoil comprising in combination, a spar member having spaced chord elements and a plurality of spaced strut members interconnecting said chord elements at one side thereof; a leading section having a plurality of plate-like rib elements spaced substantially the same as said spar strut members and a sheet metal skin covering said leading rib elements and secured at its edges to said spar chord elements, said leading rib elements being secured to said spar chord elements at the side opposite said strut members; means for relieving the connections of said rib elements with said chord elements of a portion at least of the shear loads existing in said airfoil in use, comprising metallic members extending through said spar member, and means securing said metallic members to said leading rib elements and to said spar strut members substantially midway between said spar chord elements, and a trailing section embodying a plurality of rib elements secured to said spar member.

6. An airfoil comprising in combination, a spar member having spaced chord elements and a plurality of spaced strut members interconnecting said chord elements at one side thereof; a leading section having a plurality of plate-like rib elements spaced substantially the same as said spar strut members and a sheet metal skin covering said leading rib elements and secured at its edges to said spar chord elements, said leading rib elements being secured to said spar chord elements at the side opposite said strut members; means for relieving the connections of said rib elements with said chord elements of a portion at least of the shear loads existing in said airfoil in use, comprising metallic members extending through said spar member, and means securing said metallic members to said leading rib elements and to said spar strut members substantially midway between said spar chord elements, said securing means being in shear, and a trailing section embodying a plurality of rib elements secured to said spar strut members.

7. An airfoil comprising in combination, a leading section, a trailing section, a spar connected at its outer edges to said sections, said leading section including a plurality of ribs provided with lateral flanges at the rear edge, said spar including a web with openings therethrough and a lateral chord element at each edge of the web, the rear lateral flanges of said leading ribs being secured to the spar between but near its outer edges and lateral chord elements, and connecting elements between said leading ribs and the trailing section, which connecting elements immediately extend through said spar openings.

8. An airfoil comprising in combination, a leading section, a trailing section, and a spar connected at its outer edges to said sections, said leading section including a plurality of ribs provided with lateral flanges at the rear edge, said spar including a web and a lateral chord element at each edge of the web, said trailing section including ribs aligned with the leading ribs and having struts behind and connected to said spar, and the rear lateral flanges of said leading ribs being secured to the spar between but near its outer edges and lateral chord elements and to the said struts.

9. In an airfoil, in combination, a leading section unit comprised of leading rib elements and an attached metallic skin together having beam strength, and a trailing section comprised of a spar and connected trailing rib elements adapted to be connected with the rear portion of said leading section, and means connecting the two sections together comprising shear connections between the leading section rib elements, said shear connections being located near the central inter-skin portions of the ribs, and the trailing section rib elements and connections between the leading section ribs and the spar lying outwardly of the central shear connection and inwardly of the outer edges of the spar.

10. An airfoil comprising leading and trailing sections and a web-and-chord spar intermediate the leading and trailing sections and comprehending leading and trailing ribs joined together at and between the outer edges of the spar by plural connecting means, one of which passes through the spar and another of which is located on one side only of the spar web, the structure being embodied of prefabricated leading and trailing sections, one of which is rendered unitary by ribs and preattached metallic skin and the other of which is rendered unitary by ribs and a preattached spar, and the joint comprising rib portions joined directly together by elements extending through an opening in the spar together with other rib portions joined indirectly together with the spar web interposed and secured between them.

11. An airfoil comprising leading and trailing sections and a web-and-chord spar intermediate the leading and trailing sections and comprehending leading and trailing ribs joined together at and between the outer edges of the spar by plural connecting means, one of which passes through the spar and another of which is located on one side only of the spar web, the structure being embodied of prefabricated leading and trailing sections, one of which is rendered unitary by ribs and preattached metallic skin and the other of which is rendered unitary by ribs and a preattached spar, and the joint comprising rib portions joined directly together by elements extending through an opening in the spar together with other rib portions joined indirectly together with the spar web interposed and secured between them, the indirectly joined rib portions being comprised of lateral flanges juxtaposed on opposite sides of the spar web and welded to each other through the spar web.

MICHAEL WATTER.